May 12, 1953     G. K. TURNER     2,638,491
MICROCOULOMETER
Original Filed April 19, 1948
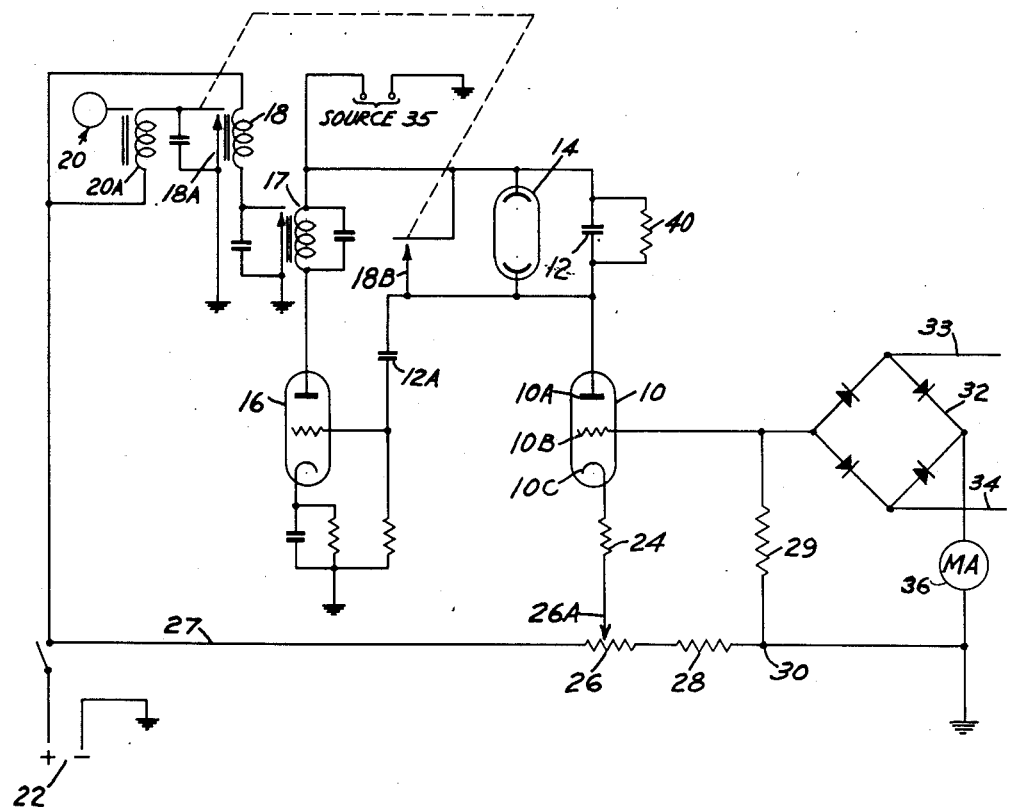
INVENTOR.
GEORGE K. TURNER
BY
ATTORNEY.

Patented May 12, 1953

2,638,491

UNITED STATES PATENT OFFICE 2,638,491

MICROCOULOMETER

George K. Turner, Pasadena, Calif., assignor to Consolidated Engineering Corporation, Pasadena, Calif., a corporation of California Original application April 19, 1948, Serial No. 21,833. Divided and this application September 19, 1949, Serial No. 116,540

6 Claims. (Cl. 171—95)

This invention relates to coulometers and particularly to an improved micro-coulometer for integrating small currents. This application is a division of my co-pending application Serial Number 21,833, filed April 19, 1948, in which the micro-coulometer of the invention is described and illustrated in combination with electrolytic titrating apparatus.

A coulometer is a meter arranged to measure the quantity of electricity in coulombs passing through a conductor. In other words the coulometer integrates the current flowing through the conductor during a period of time. In the aforementioned co-pending application the micro-coulometer of the invention is used to integrate the current supplied to generating electrodes in an electrolytic cell over a given period of time.

In one form, a conventional coulometer comprises a vacuum tube connected to charge a capacitor in proportion to the magnitude of the current being measured. A gas discharge tube is connected across the capacitor and to an amplification network in such a fashion that the capacitor is discharged through the amplification network when the voltage across the capacitor reaches the breakdown voltage of the discharge tube. In this manner, each signal from the amplifier network evidences attainment of a given voltage across the capacitor which is in turn indicative of a given current flow.

The coulometer of the invention is of the same general type as that described but includes many features which adapts it particularly to the integration of small currents representative of a function to be measured. There are many operations wherein it is desirable to measure or integrate current flow above a given background, mean or "zero" level. For example, if the current fed to various electrical apparatus, or the current developed by a detector, can be represented by the function $K+I$ where K is a constant and I is the critical current, a micro-coulometer that will automatically exclude K and integrate only the I value will expedite the operation. I have found that this distinction can be made by suppying an adjustable fixed bias to the cathode of the vacuum tube which charges the capacitor. By adjusting the magnitude of the cathode bias any "base level" current can be excluded so that the coulometer will be insensitive thereto.

Other features of the present micro-coulometer include a relay system operable responsive to the output of the discharge tube to short the capacitor and operate a counter, means for correcting for non-linearity in the response of the capacitor charging tube, and a rectifier employed in those situations where A. C. currents are being measured. The rectifier is, of course, eliminated when D. C. currents are measured.

In conventional coulometers discharge of the capacitor is generally from the breakdown voltage in the gas discharge tube to the extinction value of that tube. Hence a residual charge equivalent to the operating voltage of the discharge tube remains across the capacitor. This fact necessitates application of a larger capacitor than would otherwise be required. This condition is also detrimental from an accuracy standpoint since the difference between breakdown and extinction voltage is small as compared to the actual voltage values either or both of which may vary independently over the life of the tube. For this reason, the relative variation in difference voltage is correspondingly large.

The relay system of the present invention overcomes these disadvantages by shorting the capacitor which reduces the required size of the capacitor, and increases the accuracy and stability. Thus the initial pulse, generated by the drop from breakdown voltage to extinction voltage in the discharge tube and amplified by the amplifier tube energizes a relay which short circuits the capacitor bringing its voltage substantially to zero.

The foregoing and other features of the invention will be more clearly understood from the following detailed description thereof taken in conjunction with the accompanying drawing which is a circuit diagram of the micro-coulometer in accordance with the invention.

Referring to the drawing, the micro-coulometer includes a proportional condenser charging tube 10 (hereinafter referred to as the "charging tube") including a plate 10A, grid 10B and cathode 10C. A capacitor 12 is connected in series to the plate 10A of the tube. A gas discharge tube 14 is connected across the capacitor which discharges the capacitor and sends a pulse to an amplifier tube 16 by way of the small capacitor 12A when the voltage across the capacitor reaches the breakdown voltage of the discharge tube. Relays 17 and 18 are connected to the output of the amplifier tube; relay 17 being energized by the output voltage of the amplifier tube and operative to connect relay 18 thereto. The relay 18 is a double pole relay; one pole 18A thereof serving to actuate a magnetic counter 20 through its coil 20A, and the other pole 18B serving to short circuit the capacitor 12. A voltage source 22 is connected to the coil of relay 18 through relay 17. Thus the initial pulse, generated by the drop from breakdown voltage to operating voltage in discharge tube 14 and amplified by amplifier tube 16 energizes relay 17 which in turn closes the circuit from power source 22 through relay 18 causing it to short circuit the capacitor through pole 18B bringing the voltage of the capacitor to zero.

To correct for plate current variation in the charging tube, due to plate voltage supply variations, and to permit setting the cut-off current below which the unit ceases to operate, if desired, the micro-coulometer is provided with a special cathode biasing circuit.

Cathode 10C of tube 10 is connected through a cathode resistor 24 to the adjustable tap 26A of a slidewire resistor 26. One end of slidewire 26 is connected to the voltage source 22 through line 27 and the other end is connected through series resistors 28, 29 to the grid 10B of tube 10. The cathode bias circuit operates as a cut-off as follows:

The charging tube 10 charges condenser 12 at a rate roughly proportional to the current flowing in the cathode resistor 24. The voltage between the cathode 10C and a common point 30 between the series resistors 28 and 29 is proportional to the current flowing in resistor 29. The actual cathode biasing circuit consists of the resistors 26, 28, the circuit functioning to supply a voltage in series with the cathode 10C which allows tube 10 to pass current only after the voltage and hence current in resistor 29 has reached a predetermined value which is established by the position of the slider 26A. In this manner and with reference to the example given above wherein the total current is divisible into K and I factors, the slider 26A can be set to bias the cathode to the point where tube 10 will pass current and hence charge capacitor 12 when the current flowing through input resistor 29 exceeds K and the passed current will be proportional to I where the current flow through the input resistor is $K+I$.

The cathode biasing circuit also performs a second function. The plate voltage supplying tube 14, as applied at terminals 35, through capacitor 12 may be made roughly proportional to the D. C. voltage impressed across the cathode biasing circuit and hence compensate for changes in the level at which conduction starts in the tube 10 due to plate voltage changes. This D. C. voltage whose value is proportional to the plate voltage supply is fed into the bias circuit through line 27 which in the particular application shown is connected directly to the 6 volt D. C. source 22.

By suitable adjustment of the bias voltage, i. e. by adjustment of the tap 26A the potential below which the micro-coulometer ceases to function may be varied at will. For example, in automatic titrimeter operation as described in my co-pending application, an amplifier is controlled to supply a continuous "background" or "zero" level current to the generating electrodes, and the micro-coulometer can be set so as not to operate on this current level. The biasing circuit is in effect an adjustable fixed bias since the bias voltage is independent of tube current.

In the embodiment shown, a rectifier 32 precedes the charging tube 10 with input leads 33, 34 connected across the rectifier. A milliammeter 36 connected to the rectifier output permits instantaneous current readings if desired. The rectifier is employed only when A. C. currents are to be measured, and is eliminated when D. C. currents are involved. For measuring D. C. currents, the input leads are connected across the input resistor 29.

The coulometer preferably includes a resistance 40 usually of high value, connected across capacitor 12. This resistance has been found to correct for non-linearity in the charging tube 10 and also for non-linearity in the rectifier 32 in those applications where such a rectifier is required.

The features of micro-coulometer of the present invention, including the compensating cathode bias circuit, the resistance 40 across the capacitor for correction of non-linearity in the micro-coulometer circuit, and the relay circuit for operation of the magnetic counter and short circuiting the condenser charged by the cathode follower results, in the aggregate, in a micro-coulometer having a high degree of linearity of response, substantially no drift in zero level operation, and having low power supply requirements. Moreover, the relay system makes possible the elimination, if desired, of the amplifier. By connecting relay 17 in series between the capacitor 12 and discharge tube 14, it may be actuated directly by the current flow through the discharge tube after breakdown. Relay 17, in turn, actuates relay 18 as described.

I claim:

1. A micro-coulometer comprising a vacuum tube having an anode, cathode and grid, means for introducing the current to be measured to the grid, a capacitor connected serially to the anode, a gas discharge tube connected across the capacitor, an amplifier tube connected to the discharge tube, a magnetic counter operable by the amplifier tube, and an adjustable cathode bias circuit between the cathode and the grid of said vacuum tube and including a pair of series connected resistors, an adjustable tap connecting the cathode through a third resistor with one of the pair of resistors, the said pair of resistors being connected serially through a fourth resistor to the grid and means for impressing a potential across the cathode biasing circuit.

2. A micro-coulometer according to claim 1 wherein the means for impressing a potential across the biasing circuit is adapted to supply a voltage approximately proportional to the plate voltage supply.

3. A micro-coulometer comprising a vacuum tube having an anode, cathode and grid, means for introducing the current to be measured to the grid, a capacitor connected serially to the anode, a resistor and a gas discharge tube connected in parallel across the capacitor, an amplifier tube connected to the discharge tube, a magnetic counter operable by the amplifier tube, and an adjustable cathode bias circuit between the cathode and the grid of said vacuum tube and including a pair of series connected resistors, an adjustable tap connecting the cathode through a third resistor with one of the pair of resistors, the said pair of resistors being connected serially through a fourth resistor to the grid, and means for impressing a potential across the cathode biasing circuit whereby the tube may be biased to be sensitive to currents in excess of a given value.

4. A micro-coulometer comprising a vacuum tube having an anode, a cathode and a control grid, a first resistor having one end connected to the control grid of the tube, an input circuit connected across the first resistor, a second resistor having one end connected to the cathode of the tube, adjustable means connected to the other ends of the first and second resistors for providing a difference in potential therebetween and causing the control grid to be of negative potential with respect to the cathode, a condenser serially connected in the anode circuit of the tube, a gas discharge tube connected across the condenser, and means coupled to the gas discharge tube for providing a count of the discharges of the discharge tube.

5. The apparatus of claim 4 further including means coupled to the discharge tube for providing a short circuit across the condenser in response to each discharge of the discharge tube.

6. A micro-coulometer comprising a vacuum tube having an anode, a cathode and a control grid, a first source of potential, resistance means connected across the source of potential, an adjustable tap co-acting with said resistance means, a resistor interconnecting the adjustable tap and the cathode of the tube, a resistor connected between the control grid of the tube and that end of said resistance means which is connected to the negative terminal of the source of potential, an input circuit coupled across said last-named resistor, a condenser having one terminal connected to the anode of the tube, a second source of potential having its positive terminal connected to the other terminal of the condenser and having its negative terminal connected to the negative terminal of said first source of potential, a resistor connected across said condenser, a gas discharge tube also connected across said condenser, and means coupled to the gas discharge tube for providing a count of the discharges of the discharge tube.

GEORGE K. TURNER.

References Cited in the file of this patent

UNITED STATES PATENTS

| Number | Name | Date |
|---|---|---|
| 1,762,712 | Charlton | June 10, 1930 |
| 1,927,676 | Bedford | Sept. 19, 1933 |
| 1,933,976 | Hanson | Nov. 7, 1933 |
| 1,995,890 | Lord | Mar. 26, 1935 |
| 2,122,464 | Golay | July 5, 1938 |
| 2,250,202 | Matusita | July 22, 1941 |
| 2,374,248 | Tuttle | Apr. 24, 1945 |
| 2,404,001 | Smith | July 16, 1946 |
| 2,405,843 | Moe | Aug. 13, 1946 |
| 2,420,590 | Everhart | May 13, 1947 |
| 2,481,112 | Hanley | Sept. 6, 1949 |
| 2,483,126 | Davids | Sept. 27, 1949 |